March 17, 1931.  J. T. PEARSON  1,796,806
CONDUIT COUPLING
Filed Feb. 2, 1928
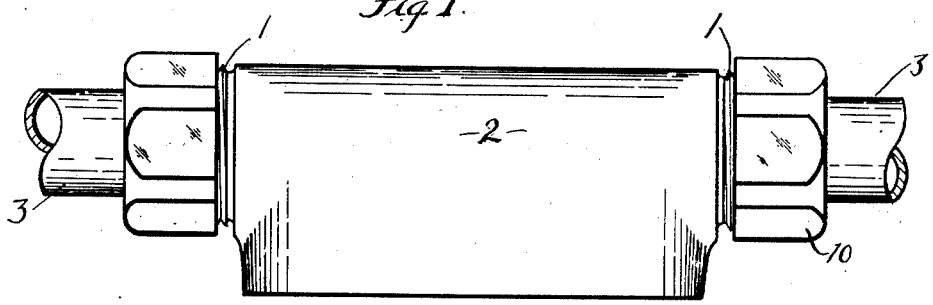
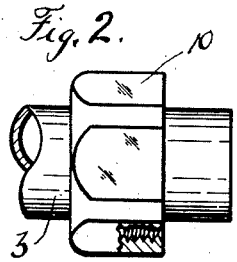
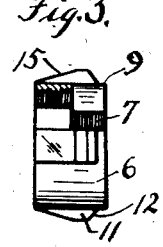
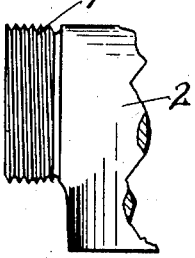
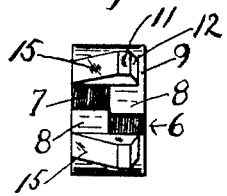
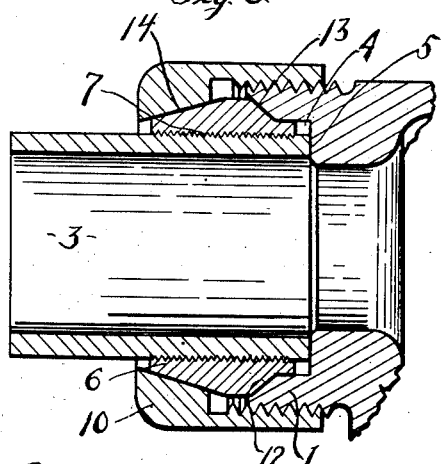
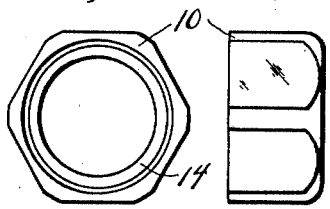
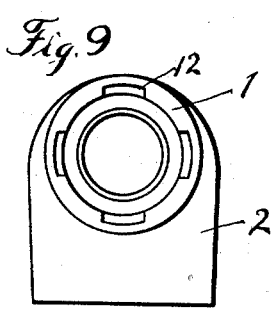
INVENTOR.
John T. Pearson
BY Parsons & Bodell
ATTORNEY.

Patented Mar. 17, 1931

1,796,806

UNITED STATES PATENT OFFICE

JOHN T. PEARSON, OF SYRACUSE, NEW YORK, ASSIGNOR TO CROUSE-HINDS COMPANY, OF SYRACUSE, NEW YORK, A CORPORATION OF NEW YORK

CONDUIT COUPLING

Application filed February 2, 1928. Serial No. 251,237.

This invention relates to conduit couplings particularly means for coupling electrical conduits or of coupling an electrical conduit to a box as an outlet box connected in the conduit system and has for its object, a particularly simple and efficient means by which the conduit can be coupled to a box or to another conduit without being threaded and means by which the conduit can not be loosened from the conduit by the turning of the conduit.

The invention consists in the novel features and in the combinations and constructions hereinafter set forth and claimed.

In describing this invention, reference is had to the accompanying drawings in which like characters designate corresponding parts in all the views.

Figure 1 is a side elevation of a conduit outlet box and conduit provided with this coupling.

Figure 2 is a fragmentary detail view of a conduit end with the nut of the coupling thereon, the nut being partly in section.

Figure 3 is an elevation partly in section of the contractile collar showing the same in juxtaposition to the conduit shown in Figure 1.

Figure 4 is a fragmentary elevation of a conduit outlet box having a threaded nipple, the same being shown in juxtaposition to the collar of Figure 3 and the conduit end and nut of Figure 2 before the parts are brought together.

Figure 5 is an elevation of the contractile collar.

Figure 6 is an enlarged sectional view through the assembled conduit end, outlet box and coupling.

Figures 7 and 8 are respectively an end view and side elevation of a nut.

Figure 9 is an end view of the conduit outlet box showing an end elevation and the body of the coupling associated with the box.

This coupling is particularly adapted for use on threadless conduit ends because there are no threads to hold the conduit rigid. It is necessary that the conduit without threads be clamped rigidly and that the clamping means compensate for variations within limits in the diameter and the contour of the conduit.

In commercial conduits, the normal diameters vary, for instance in standard ½ inch conduits the normal diameter is .840 and these conduits have been found to vary from a minimum of .825 to .855.

Also, it is necessary that the coupling must clamp the conduit with sufficient rigidity to prevent sagging of the conduit line even though it is insufficiently supported. Also, the clamping means must tightly grip the conduit and not be loosened even though the conduit is sprung or turned in either direction.

This feature of tightly clamping the conduit is important where the conduit as it generally does, serves as a ground conductor. Also, the clamping collar in addition to being capable of differential contracting movements to conform to irregularities in the surfaces of the conduits and in some cases to threaded tapered ends, must be locked to prevent any movement, particularly turning movement of the conduit that would loosen the nut of the coupling and a ball and socket movement.

My conduit coupling solves all of the above-mentioned problems and comprises a threaded body having a passage for receiving a conduit end, a contractile collar mountable on the conduit end and having a portion extending into the passage and a nut threading on the body, the parts having coacting means for contracting the collar during the tightening of the nut, and the body and the collar having means for interlocking during tightening of the nut to prevent turning of the collar and the nut if after the joint is made, the conduit is turned.

It will be understood that in assembling the parts of the conduit system after the joint is made, the workman in making a joint at the other end of the pipe may put a pipe wrench on the pipe and turn it and in so doing, loosen the joint.

The body of the coupling is here shown as a threaded nipple 1 provided on a conduit outlet box 2, although the body 1 may be independent of a box as 2 or the box 2 may be considered as part of a coupling between two conduits.

The box here shown is provided with two threaded nipples 1 for connection to two different conduits.

3 designates the conduits, the end of each of which projects into a passage 4 of the body and preferably abuts against an internal annular shoulder 5 at the inner end of the body.

6 designates the contractile collar mountable on the end of the conduit 3. The collar is preferably formed to tightly grip the pipe end without threading the pipe end. It is here shown as provided with cutting projections 7 on its internal surface for cutting into the pipe end during the contracting of the collar, these projections being shown as fine screw threads. The collar 6 is shown as split transversely and the line of division is preferably not straight but angular as seen in Figure 5 so as to form tongues 8 which lap each other edgewise. The inner end portion 9 of the collar fits or extends into the passage 4 of the body 1.

10 designates the nut enclosing the pipe end and the collar and thrusting against the collar, the nut threading on the body 1. Means is provided for contracting the collar on the pipe end during the tightening of the nut and causing the threads 7 to cut into the threadless conduit end 3. The coacting means for preventing turning of the collar particularly retrograde turning if the conduit end is turned, comprises projections and notches associated with the body and the collar and arranged to come into alinement and interlock during the tightening of the nut, this interlocking means being provided on abutting end portions of the body and the collar.

In the illustrated embodiment of my invention, the collar is provided with lengthwise peripheral projections 11 and the body with notches 12 in the end thereof around the passage 4, the notches being of greater width than the projections to permit the collar to contract after the projections are in the notches. The projections and the notches are provided with coacting cam means which act to contract the collar during tightening of the nut and as here illustrated, the projections are provided with inclined end faces 12 which coact with complemental inclined faces 13 at the bottom of the notches 12.

The principal means for contracting the collar is however, provided on the nut and the projections, the nut being provided with an internal conical cam or conical face 14 at its outer end and the projections being formed with inclined faces 15 for coacting with the conical face 14, the faces 15 being of less inclination than the cam faces 12. It is these cam faces of different inclination that effect the differential contraction of the collar to fit irregularities in the pipe ends and also tapered and also prevent a ball and socket action.

In operation, the pipe end is first placed in the passage 4 and the collar moved axially into the passage 4 and the nut tightened. During the initial turning of the nut, the collar is thrust endwise and turned until the projections 11 come in alinement with the notches 12 so that during further endwise movement, they move into interlocking engagement with the notches 12. During continued tightening of the nut 10, the collar is contracted by the coaction of the conical faces 14 and inclined plane faces 15 and also by the coaction of the inclined cam faces 12 on the collar and the faces 13 at the bottom of the notches 12. As the nut is now tightened, the collar is tightly contracted on the conduit end 3 and conforms to irregularities of the surface of the conduit end and the threads or teeth 7 cut into the conduit end forming practically a threaded joint without previously cutting threads on the conduit 3.

After the joint is completed, it rigidly supports the conduit against all displacement and can not be loosened by the workman manipulating the conduit 3 as for instance, when he is coupling the other end of the conduit to something.

What I claim is:

1. A conduit coupling comprising a threaded body having a passage for receiving a conduit end, a contractile collar mountable on the conduit end and having a portion extending into said passage, the collar having a peripheral projection and the body having a recess for receiving the projection and of greater width than the projection for permitting the contractile movement of the collar and a nut enclosing the pipe end and the collar and threading on the body and means for contracting the collar on the conduit as the nut is threaded on the body.

2. A conduit coupling comprising an externally threaded body having a passage for receiving a conduit end, a contractile collar mountable on the end of the conduit and having a portion extending into said passage and also having a peripheral projection, the body having a notch in its end for receiving the peripheral projection, the projection and the bottom wall of the notch having coacting cam means acting to contract the collar when the same is forced into the body and a nut threading on the body and enclosing a conduit end and the collar and coacting with the collar to thrust it axially into the body.

3. A conduit coupling comprising an externally threaded body having a passage for receiving a conduit end and having notches therein with bottom surfaces inclined to the axis of the passage, a contractile collar mountable on a conduit end and having lengthwise peripheral projections, each projection having inclined surfaces extending towards each end of the collar, the inclined surfaces at the inner end extending into the notches in the passage and coacting with the inclined bottoms thereof, a nut threading on the body and having a tapered bore coacting with the inclined surfaces at the outer end for thrusting the collar towards the body and contracting the same upon the conduit.

In testimony whereof, I have hereunto signed my name, at Syracuse, in the county of Onondaga and State of New York, this 31 day of January, 1928.

JOHN T. PEARSON.